July 26, 1955     L. O. SIMENSON     2,714,045
SEAL FOR HIGH SPEED ROTARY SHAFTS
Filed March 5, 1953     2 Sheets-Sheet 1

INVENTOR.
Louis O. Simenson
BY

Griswold & Burdick
ATTORNEYS

July 26, 1955 L. O. SIMENSON 2,714,045
SEAL FOR HIGH SPEED ROTARY SHAFTS
Filed March 5, 1953 2 Sheets-Sheet 2

INVENTOR.
Louis O. Simenson
BY
Griswold & Burdick
ATTORNEYS

United States Patent Office 2,714,045
Patented July 26, 1955

2,714,045

SEAL FOR HIGH SPEED ROTARY SHAFTS

Louis O. Simenson, Berkeley, Calif., assignor to The Dow Chemical Company, Midland, Mich., a corporation of Delaware Application March 5, 1953, Serial No. 340,494

2 Claims. (Cl. 308—36.3)

This invention relates to an improved simple and effective seal for shafts which turn at speeds of the order of 2,000 to 20,000 revolutions per minute. It relates in particular to such a seal for use where toxic, flammable or corrosive materials must be confined in a vessel which is penetrated by a high speed shaft.

Those common seals which depend on finely machined bearing surfaces are relatively ineffective at high speeds, especially when the material to be confined is under a superatmospheric pressure. Packed seals which depend upon compressible packing fail when the material being confined is an active solvent, and especially if it is at superatmospheric pressure. The usual labyrinth seal cannot be used where wide variations in pressure are encountered, especially if the material being confined is corrosive, as even infrequent leaks of corrosive material are ruinous to high speed precision bearings and shafts.

It is an object of this invention to provide a seal for continuous use on high speed shafts, capable of trouble-free operation over a wide range of pressure differentials.

The invention, whereby the foregoing and related objects are realized, is a composite centrifugal liquid seal and multiple labyrinth seal to be described more fully with respect to the annexed drawings, wherein.

The invention will be described as though the shaft is vertical and enters the vessel from beneath, but such description is for convenience only, as the seal is operative in any position and the shaft may enter at top, bottom or side of the vessel.

Figure 3:
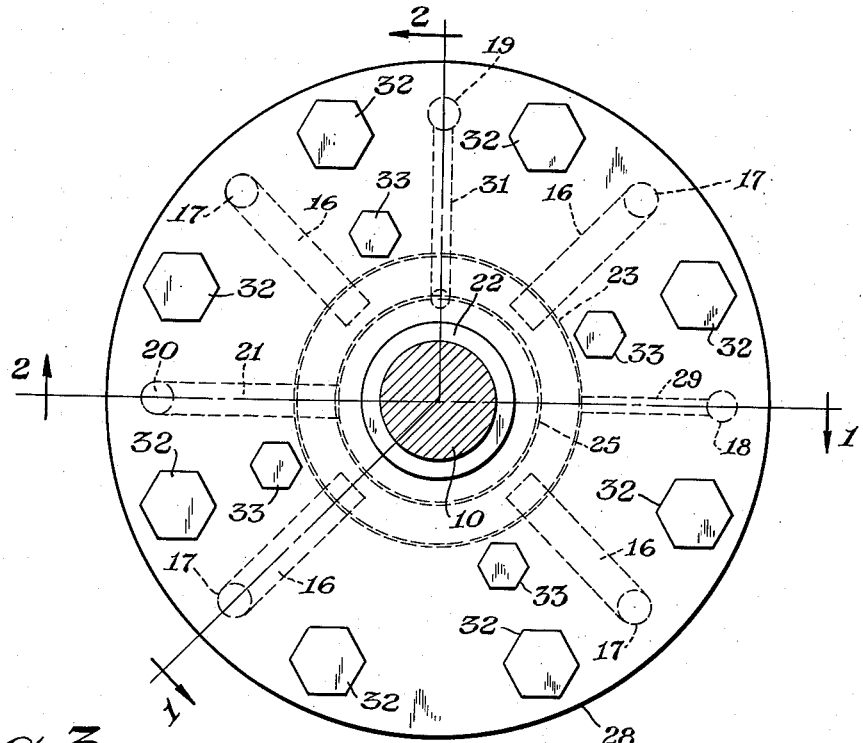
Fig. 3 is a plan view of the seal, showing relative locations of various flow channels therein.
Figure 1:
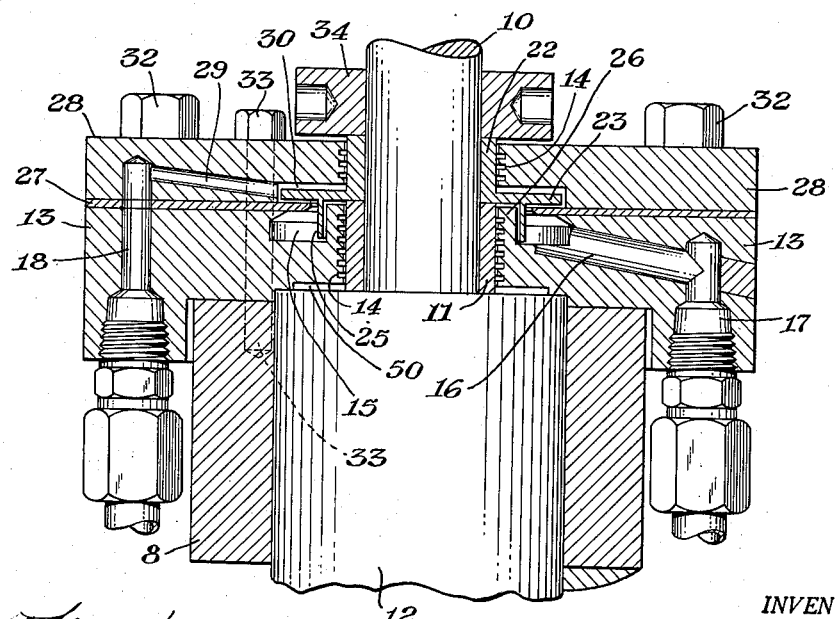
Fig. 1 is a longitudinal section through the seal assembly, showing the shaft in elevation, taken along line 1—1 of Fig. 3.
Figure 2:
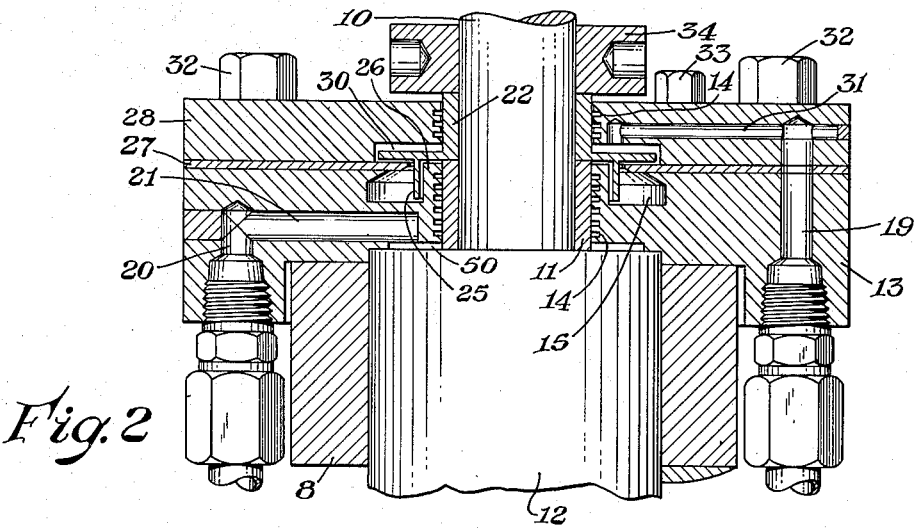
Fig. 2 is a similar section taken along line 2—2 of Fig. 3.
Figure 5:
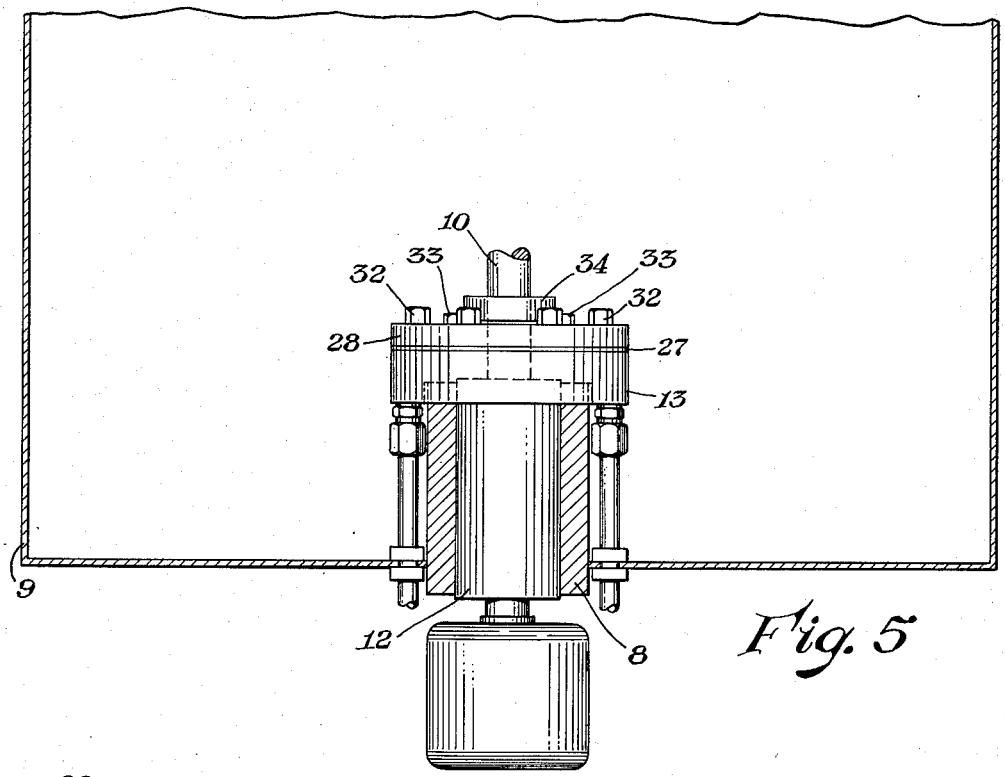
Fig. 5 is a section showing the new seal installed in the wall of a vessel.
Figure 4:
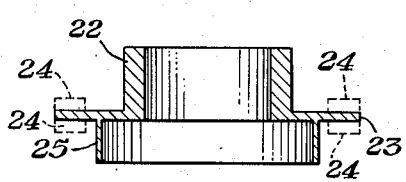
Fig. 4 is a longitudinal midsection through the spinner or centrifugal member, with optional impeller blades shown in dotted outline.

A cylindrical bearing housing 8 is set into the wall of a vessel 9. High speed shaft 10, entering vessel 9, is provided with a press-fitted collar 11 which is seated against the inner end of bearing 12 contained in cylindrical housing 8. A bearing end housing 13, coaxial with shaft 10 and collar 11, and bored for free rotation of the shaft and collar, is seated on bearing 12 and is preferably chamfered above and medially from said seat to provide a lubrication chamber over the end of bearing 12. The hub 26 of end housing 13 is of slightly less height than collar 11, and is preferably provided with a plurality of uniformly spaced horizontal grooves 14 on its inner cylindrical face. Housing 13 is provided with a deep circular channel 15 in its upper face, having a somewhat greater minimum diameter than the maximum diameter of the said grooves 14 in the hub. Channel 15 is in communication with a plurality of evenly spaced radial bores 16 each of which is connected with a drainage outlet 17. Exteriorly of channel 15, housing 13 has a plane upper surface at a lower level than the top of its hub 26. Housing 13 is provided further with a vertically bored inlet 18 and a similar inlet 19, both of which pass through housing 13, and a vertically bored inlet 20 which extends only to about the horizontal midline of housing 13 and communicates with a radial bore 21 extending to the lubrication chamber 50 over bearing 12. Overlying housing 13 is a spacer ring 27 whose internal diameter is less than the maximum diameter of channel 15 but greater than its minimum diameter. Spacer ring 27 is of a thickness equal to the difference in level between the outer plane of housing 13 and the upper end of hub 26, and ring 27 is bored to match inlets 18 and 19 in housing 13. Mounted on shaft 10, and resting on collar 11, is a spinner which consists of an upstanding collar portion 22, a horizontal disk member 23 which may have vertical impeller blades 24 on both surfaces (Fig. 4), and a dependent cylindrical skirt member 25. Collar portion 22 is press fit to shaft 10. Horizontal disk or spinner plate 23 overlies channel 15 and the inner edge of spacer ring 27, while dependent skirt 25 extends nearly to the bottom of channel 15 and has a diameter only slightly greater than the inner diameter of channel 15. The seal assembly is completed by a cap ring 28 having the same internal diameter as that of housing 13 and being chamfered in its lower face to provide clearance for spinner disk 23 and for any small impeller blades 24 thereon, and horizontally grooved in its central bore to provide labyrinth grooves 14 like those in housing 13. Cap ring 28 is vertically bored from its lower face to provide extensions of inlets 18 and 19, and is radially bored from inlet 18 to provide a conduit 29 to the periphery of the spinner chamber 30 and is similarly bored from inlet 19 to provide a conduit 31 to a point near the inner end of spinner chamber 30. Cap ring 28, spacer ring 27 and housing 13 are fastened together, as by bolts 32, and the whole assembly is fastened to cylindrical bearing housing 8 by bolts 33. Spinner plate 23 is prevented from rising in its chamber 30 by a locknut 34 or similar means mounted on shaft 10 and pressing against the spinner collar 22.

In operation of the high speed shaft and seal, an oil mist is admitted through inlet 20 and conduit 21 to lubricate bearing 12. Some of the mist rises through the labyrinth around collar 11 and enters channel 15, finally passing out through conduits 16 and drainage outlets 17. When this occurs, the motor driving shaft 10 is started. When shaft 10 is at full speed, the oil mist is continued and water is introduced continuously through inlet 18 and conduit 29 to the periphery of spinner disk 23. The water should be fed at a rate such that the effluent water is well below the boiling point, preferably below 125° F. If desired, and especially when the atmosphere above the seal may contain dusts or corrosive matter, an inert purging gas is admitted through inlet 19 and conduit 31. Such a gas is supplied under slightly greater pressure than that in vessel 9, and passes upward around spinner collar 22, through the grooves 14 in cap member 28, and prevents foreign matter from reaching and dissolving in the sealing water.

Because of the pressure in vessel 9, water on the upper surface of spinner disk 23 is forced further from the axis of rotation than that on the lower face. Since water is supplied continuously, it spills over the inner edge of spacer ring 27 into channel 15. Spinner skirt 25 prevents water in channel 15 from reaching the labyrinth around collar 11, and the water flows to the periphery and out through the plural drains 17. The labyrinth around collar 11 is continuously lubricated with the oil mist, as is the top of the high speed bearing 12. The purging gas keeps the upper labyrinth substantially free from solids and corrosive matter, and is chosen to be inert to the materials in vessel 9.

Since the liquid used for sealing (usually water) is supplied at the periphery or normal discharge point of spinner plate 23, much higher pressures can be contained in vessel 9 than with a static liquid seal or with one in which the liquid is supplied near the axis of rotation. For higher pressures it is only necessary to increase the flow of water to maintain the seal. With small clearances between the spinner members and their housing, the spinner acts as a pump, increasing the pressure drop across the seal.

In a specific installation, a shaft turning at 12,000 revolutions per minute penetrated a vessel in which powdered caustic soda, powdered alkali metal alkyl xanthates, and the vapors of carbon disulfide, alcohol and water were confined under superatmospheric pressure. Ordinary friction seals were soon destroyed by the corrosive and abrasive powders. Ordinary labyrinth seals became plugged with the same powders and then failed due to abrasion and corrosion. Any leakage quickly ruined the precision high speed bearing below the vessel. Packed seals failed within as little as a few hours and none were found to last more than a few days, due to the action of the solvents and chemicals present. When the seal of the present invention was substituted for those previously used, no trouble was encountered and none is foreseen after several months of continuous service. The shaft was about 1 inch in diameter and the entire seal assembly was 5.5 inches in diameter. Water was used as the sealing liquid, being introduced at about 55° F. at a rate of 2 to 3 U. S. gallons per hour and being discharged at 100° to 125° F. The purge gas employed in this installation was methane.

I claim:

1. A seal assembly for a high speed shaft passing through the wall of a vessel comprising a bearing on said shaft spaced from said vessel wall; a collar on said shaft revolubly seated on said bearing; a fixed housing member provided with a recess for and seated on said bearing, having a hub which is shorter and of greater diameter than said collar; a circular channel in the opposite face of said housing from the bearing, outside of said hub and in communication with a radially bored drainage outlet; a spinner member comprising a collar on said shaft seated on the first said collar, a transverse disk extending partially over said channel, and a cylindrical skirt projecting from said disk into said circular channel; a cap ring coaxial with the shaft, bored for free rotation of the shaft, chamfered in one face to cooperate with said circular channel so as to provide a chamber with clearance for the spinner disk, and bored radially to the periphery of the spinner chamber for admission of sealing liquid; means for securing the seal to the vessel wall; means for holding the sealing elements together; and means for lubricating the end of the bearing adjacent the seal.

2. A seal assembly for a high speed shaft passing through the wall of a vessel comprising a bearing on said shaft spaced from said vessel wall; a collar on said shaft revolubly seated on said bearing; a fixed housing member provided with a recess for and seated on said bearing, having a hub which is shorter and of greater diameter than said collar; said hub being provided with a plurality of evenly distributed grooves concentric with the hub; the inner plane of said housing externally of said hub being more distant than the top of the hub from the point of emergence of the shaft into the vessel; a circular channel in the inner face of said housing surrounding said hub and in communication with a plurality of regularly spaced radially bored drainage outlets; a radially bored lubrication conduit in said housing extending to the said bearing recess in the outer center of the housing; a spacer ring overlying the inner face of said housing, of a thickness equal to the difference between the thickness of the main housing body and the length of the central hub, having an inner diameter greater than that of the hub and less than the outer diameter of the said circular channel; a spinner member comprising a collar on said shaft seated on the first said collar, a transverse disk extending partially over said channel, and a cylindrical skirt projecting from said disk into said circular channel; a cap ring coaxial with the shaft, bored for free rotation of the shaft, chamfered in one face to cooperate with said circular channel so as to provide a chamber with clearance for the spinner disk, and bored radially to the periphery of the spinner chamber for admission of sealing liquid; said cap ring also being bored radially to a point near the axis of the spinner chamber for admission of purging gas, and having a plurality of evenly distributed grooves in the wall of its axial bore; means for securing the seal to the vessel wall; and means for holding the sealing elements together.

References Cited in the file of this patent

UNITED STATES PATENTS

| Number | Name | Date |
|---|---|---|
| 969,869 | Hodgkinson | Sept. 13, 1910 |
| 1,122,051 | Wohlenberg | Dec. 22, 1914 |
| 2,356,011 | Sheldon | Aug. 15, 1944 |
| 2,580,529 | Dietz | Jan. 1, 1952 |